US011132595B1

(12) United States Patent
Alberth, Jr. et al.

(10) Patent No.: US 11,132,595 B1
(45) Date of Patent: Sep. 28, 2021

(54) METHOD AND APPARATUS FOR PROVIDING RADIO-FREQUENCY SHIELDING INFORMATION

(71) Applicants: William P. Alberth, Jr., Prairie Grove, IL (US); John Cipolla, Inverness, IL (US)

(72) Inventors: William P. Alberth, Jr., Prairie Grove, IL (US); John Cipolla, Inverness, IL (US)

( * ) Notice: Subject to any disclaimer, the term of this patent is extended or adjusted under 35 U.S.C. 154(b) by 10 days.

(21) Appl. No.: 16/891,059

(22) Filed: Jun. 3, 2020

(51) Int. Cl.
| | | |
|---|---|---|
| *G08B 21/00* | (2006.01) |
| *G06K 19/077* | (2006.01) |
| *G06K 7/10* | (2006.01) |
| *G06K 19/07* | (2006.01) |
| *H04B 5/00* | (2006.01) |
| *H01Q 1/22* | (2006.01) |
| *G06K 7/00* | (2006.01) |

(52) U.S. Cl.
CPC ..... *G06K 19/07749* (2013.01); *G06K 7/0008* (2013.01); *G06K 7/10346* (2013.01); *G06K 7/10356* (2013.01); *G06K 19/0723* (2013.01); *H01Q 1/2225* (2013.01); *H04B 5/0062* (2013.01)

(58) Field of Classification Search
CPC ......... G06K 19/07749; G06K 7/10356; G06K 7/10346; G06K 19/0723; G06K 7/0008; H01Q 1/2225; H04B 5/0062
USPC ...................................................... 340/572.1
See application file for complete search history.

(56) References Cited

U.S. PATENT DOCUMENTS

| | | | |
|---|---|---|---|
| 2,285,083 | A | 6/1942 | Cover |
| 3,039,172 | A | 6/1962 | Egan |
| 3,349,396 | A | 10/1967 | Reed |
| 4,064,305 | A | 12/1977 | Wallin |
| 4,420,757 | A | 12/1983 | Ebneth et al. |
| 4,572,960 | A | 2/1986 | Ebneth et al. |

(Continued)

FOREIGN PATENT DOCUMENTS

| | | |
|---|---|---|
| CN | 202035510 U | 11/2011 |
| DE | 29616182 U1 | 1/1997 |
| WO | 9940808 A1 | 8/1999 |

OTHER PUBLICATIONS

RFID Journal, RFID Frequently Asked Question—Can RFID tags be sewn into clothing, https://rfidjournal.com/faq/show31, Nov. 18, 2019.

*Primary Examiner* — Mark S Rushing
(74) *Attorney, Agent, or Firm* — Loppnow & Chapa; Matthew C. Loppnow

(57) ABSTRACT

An apparatus can include a plurality of antennas. The apparatus can include a first transceiver coupled to the plurality of antennas. The apparatus can include a second transceiver. The second transceiver can be an RFID transceiver. The apparatus can include a controller coupled to the first transceiver and coupled to the RFID transceiver. The controller can detect the presence of an RFID tag. The controller can retrieve, in response to detecting the presence of the RFID tag, information corresponding to the RFID tag. The information can include radio-frequency shielding information regarding electrically conductive material of an article of clothing. The controller can adjust the first transceiver based on the information retrieved corresponding to the RFID tag.

20 Claims, 6 Drawing Sheets

(56) References Cited

U.S. PATENT DOCUMENTS

| | | | |
|---|---|---|---|
| 4,584,709 A * | 4/1986 | Kneisel | H04B 1/38 455/78 |
| 5,103,504 A | 4/1992 | Dordevic | |
| 5,115,140 A | 5/1992 | Rodriguez | |
| 5,950,237 A | 9/1999 | Micheron et al. | |
| 6,788,262 B1 | 9/2004 | Adams | |
| 6,795,975 B2 | 9/2004 | Marmaropoulos | |
| 6,972,725 B1 | 12/2005 | Adams | |
| 8,013,776 B2 | 9/2011 | Child | |
| 8,410,461 B2 | 4/2013 | Stinkard et al. | |
| 8,898,816 B2 | 12/2014 | Highfield | |
| 9,362,618 B2 | 6/2016 | Alberth, Jr. et al. | |
| 9,639,797 B2 | 5/2017 | Cardullo | |
| 10,128,564 B2 * | 11/2018 | Walker | H01Q 9/16 |
| 10,334,898 B2 | 7/2019 | Alberth, Jr. et al. | |
| 2006/0148404 A1 * | 7/2006 | Wakim | H04M 17/20 455/41.2 |
| 2007/0008140 A1 * | 1/2007 | Saarisalo | G06K 7/10178 340/572.7 |
| 2007/0178935 A1 * | 8/2007 | Shim | H04W 52/0235 455/552.1 |
| 2008/0129457 A1 * | 6/2008 | Ritter | G07C 9/257 340/10.1 |
| 2011/0016615 A1 | 1/2011 | Massey | |
| 2012/0047631 A1 | 3/2012 | Connolly | |
| 2012/0060261 A1 | 3/2012 | Raviv | |
| 2012/0114270 A1 | 5/2012 | Roberts | |
| 2012/0185999 A1 | 7/2012 | Raviv | |
| 2012/0186000 A1 | 7/2012 | Raviv | |
| 2012/0228954 A1 | 9/2012 | Kesler et al. | |
| 2014/0159873 A1 * | 6/2014 | Ratcliff | H04W 48/10 340/10.5 |
| 2014/0159876 A1 | 6/2014 | Oh | |
| 2014/0210624 A1 * | 7/2014 | Wandel | G08B 13/1427 340/572.1 |
| 2014/0361089 A1 | 12/2014 | Kai | |

\* cited by examiner

METHOD AND APPARATUS FOR PROVIDING RADIO-FREQUENCY SHIELDING INFORMATION

BACKGROUND

1. Field

The present disclosure is directed to a method and apparatus for providing radio-frequency shielding information. More particularly, the present disclosure is directed to providing radio-frequency shielding information for an article of clothing.

2. Introduction

Presently, wireless communication devices, such as User Equipments (UE), communicate with other communication devices using wireless radio-frequency signals. UEs can include smart phones, personal digital assistants, cell phones, and other wireless communication devices. While there is no conclusive evidence that absorption of radiation from the radio-frequency signals from UEs cause an adverse health effects, many individuals believe that less exposure to the radio-frequency signals is better.

Third Generation Partnership Project (3GPP) Fifth Generation (5G) UEs will operate in two frequency ranges, with the first frequency range being below 6 GHz and the second frequency range being a millimeter wave (mmWave) band above 6 GHz. Some governments regulate exposure to radiation for consumer devices including UEs operating in these frequency ranges. For example, below 6 GHz, Specific Absorption Rate (SAR) is a measure of the rate at which energy is absorbed by the human body when exposed to a radio-frequency electromagnetic field. It is defined as the power absorbed per mass of tissue and has units of watts per kilogram (W/kg) and milliwatts per gram (mW/gram). SAR is used to regulate how much power can thermally heat human tissue. Above 6 GHz, Incident Power Density (IPD) is used to regulate how much power is incident on human tissue in terms of milliwatts per square centimeter (mW/cm^2). Operation in the mmWave band above 6 GHz will be difficult when a UE is in a pocket and subject to federally mandated IPD limits, especially because IPD requirements are more difficult to meet than SAR requirements. This means that UEs will have to cripple their radio-frequency power to meet the IPD requirements, which will result in performance degradation.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for providing radio-frequency shielding information.

According to a possible embodiment, an article of clothing can include a clothing body adapted to be worn by a user. The article of clothing can include a pocket assembly formed as part of the clothing body. The pocket assembly can include an inner panel disposed as a part of the pocket assembly. The inner panel can include an electrically conductive material. The pocket assembly can also include an outer panel disposed as a part of the pocket assembly that is farther than the inner panel from a user wearing the article of clothing. The article of clothing can include a Radio-Frequency Identification (RFID) tag coupled to the clothing body. The RFID tag can store radio-frequency shielding information regarding the electrically conductive material of the article of clothing.

According to another possible embodiment, an apparatus can include a plurality of antennas. The apparatus can include a first transceiver coupled to the plurality of antennas. The apparatus can include a second transceiver. The second transceiver can be an RFID transceiver. The apparatus can include a controller coupled to the first transceiver and coupled to the RFID transceiver. The controller can detect the presence of an RFID tag. The controller can retrieve, in response to detecting the presence of the RFID tag, information corresponding to the RFID tag. The information can include radio-frequency shielding information regarding electrically conductive material of an article of clothing. The controller can adjust the first transceiver based on the information retrieved corresponding to the RFID tag.

Figure 1:
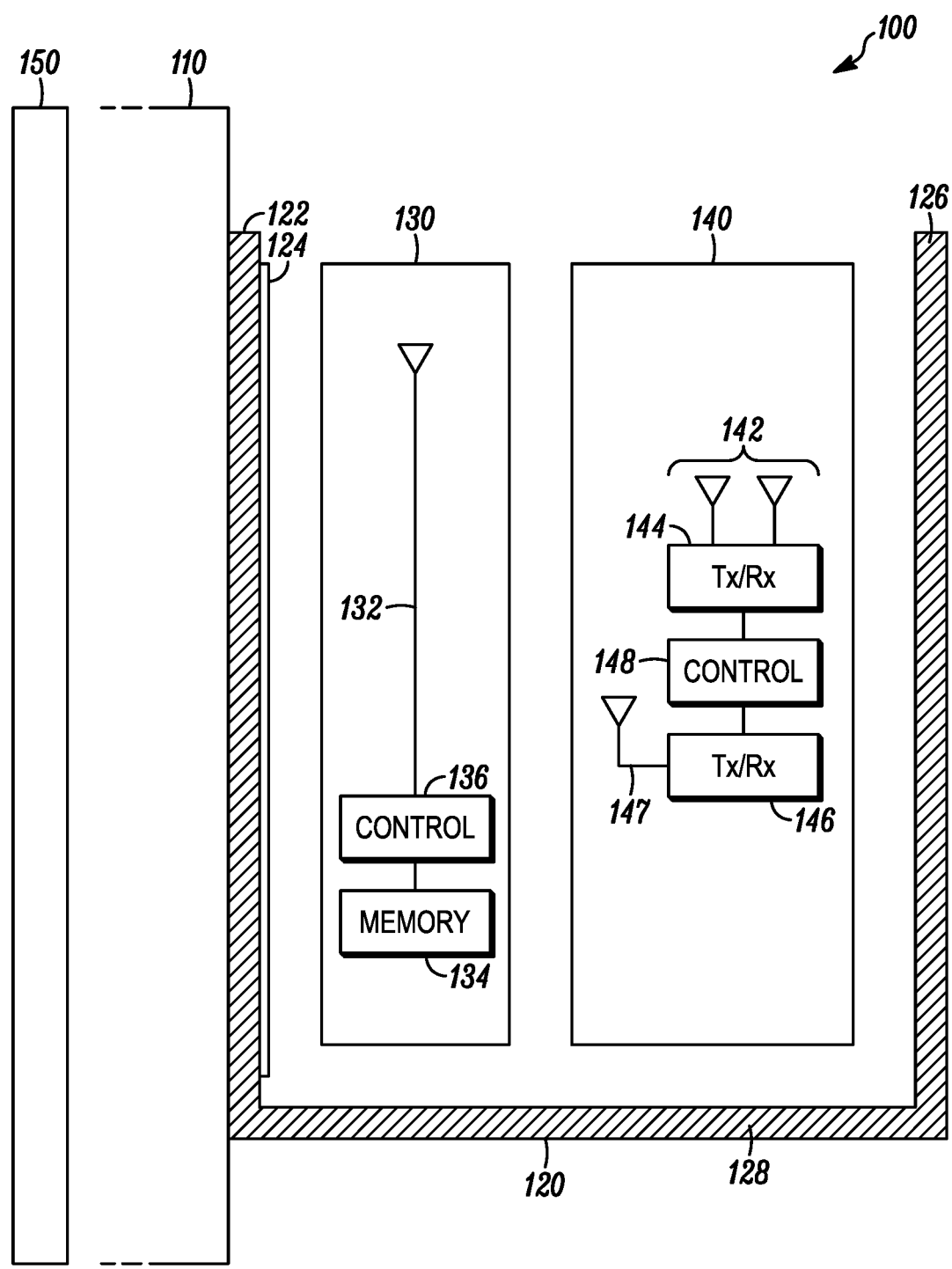
FIG. 1 is an example illustration of an article of clothing and a portable electronic device according to a possible embodiment.

FIG. 1 is an example illustration of an article of clothing 100 and a portable electronic device 140 according to a possible embodiment. The article of clothing 100 can include a clothing body 110 adapted to be worn by a user 150. The article of clothing 100 and/or the clothing body 110 can be a garment, such as a shirt, pants, a vest, or other garment, can be a wristband, can be an arm strap, can be a hat, can be a purse, can be a backpack, and/or can be any other clothing that can be worn by a user. The article of clothing 100 can also just be a portion of an article of clothing that can be attached to another article of clothing.

The article of clothing 100 can also include a pocket assembly 120 formed as part of the clothing body 110. The pocket assembly 120 can include an inner panel 122 disposed as a part of the pocket assembly 120. The inner panel 122 can include an electrically conductive material 124. While the electrically conductive material 124 is shown on one side of the inner panel 122, the electrically conductive material 124 can be on either side of the inner panel 122, can be interwoven into the inner panel 122, can be the inner panel 122 itself, and/or can otherwise be included with the inner panel 122.

The electrically conductive material 124 can be a shield material, such as a conductive textile, a semi-conductive textile, a coating to the existing fabric, or any other shield material that inhibits passage of radio-frequency signals. The electrically conductive material 124 can also be a mesh made of conductive material or coated with conductive material. The electrically conductive material 124 can further be metallic material, shielding fabric, conductive wool, conductive foam, conductive glue, conductive paint, or any other electrically conductive material. The electrically conductive material 124 can additionally be a combination of more than one of the above-identified materials and/or other materials.

According to a possible embodiment, the pocket assembly 120 itself may be constructed of textile material that is conductive, a layer of conductive material may be added to an existing pocket assembly, a layer of conductive glue or paint may be applied to the pocket assembly 120, and/or a layer of conductive material may be attached with an adhesive or sewn to the pocket assembly 120. The electrically conductive material 124 can also be riveted in place so as to be situated between a user 150 and objects located within the pocket assembly 120.

The pocket assembly 120 can also include an outer panel 126 disposed as a part of the pocket assembly 120 that can be, such as adapted to be, farther than the inner panel 122 from a user 150 wearing the article of clothing 100. The outer panel 126 can be a panel on an outer side of a pocket, can be a strap, can be a panel of a device case that faces away from a user 150, or can be any other outer panel.

The pocket assembly 120 can be internal to, external to, and/or integral with the clothing body 110. For example, the pocket assembly 120 can be external to the clothing body 110 by being a breast pocket on a shirt or an external pocket on a jacket. Alternately, the pocket assembly 120 can be internal to the clothing body 110 by being a front pocket in a pair of pants or by being a pocket on an interior of a jacket that is closer to a user 150 than a shell of a jacket. The pocket assembly 120 can also be integral with the clothing body 110 such as by being a pocket connected to straps to form an armband. In each instance, the inner panel 122 with the electrically conductive material 124 can be closer to the user 150 than the outer panel 126.

According to a possible embodiment, the pocket assembly 120 can be configured to hold a portable electronic device 140 that emits radio-frequency energy. The electrically conductive material 124 can be shield material that shields the user 150 from the radio-frequency energy emitted from the portable electronic device 140. The portable electronic device 140 does not require an external power supply for operation of the portable electronic device 140. The portable electronic device 140 also does not require a wire to provide power to the RFID tag 130. The portable electronic device 140 can be carried by a single user, such as in a user's hand, pocket, backpack, arm strap, or otherwise carried by a single user.

The article of clothing 100 can additionally include a RFID tag 130 coupled to the clothing body 110. The RFID tag 130 can store radio-frequency shielding information regarding the electrically conductive material of the article of clothing 100. The RFID tag 130 can be coupled to the pocket assembly 120, can be part of the inner panel 122, can be part of the outer panel 126, or can be anywhere else on the article of clothing 100, the clothing body 110, and/or the pocket assembly 120.

The radio-frequency shielding information can be merely an identifier of the RFID tag 130 that identifies the RFID tag 130 as corresponding to radio-frequency shielding material, such as the electrically conductive material 124, that is in proximity to a portable electronic device coupled to the RFID tag 130, such as coupled to the RFID tag 130 via radio-frequency signals. It should be noted that the radio-frequency shielding material 124 may not shield the RFID tag 130 from radio-frequency signals received from a portable electronic device 140 relevant to the RFID tag 130.

The RFID tag 130 can operate in at least one of a Low Frequency (LF) 125–134 kHz range, a High Frequency (HF) 13.56 MHz range, an Ultra High Frequency (UHF) 856 MHz to 960 MHz range, and/or any other frequency range or combination of ranges. For example, the RFID tag 130 can be a Near Field Communication (NFC) tag that operates in the HF range.

According to a possible embodiment, the RFID tag 130 can be located in the pocket assembly 120 so that the portable electronic device 140 stored in the pocket assembly 120 is coupled to and communicates with the RFID tag 130. When a portable electronic device 140, such as a cell phone is in the pocket assembly 120, the portable electronic device 140 can lay on top of the RFID tag 130, thereby coupling to it. The coupling can also be accomplished by the device 140 otherwise being in proximity of the RFID tag 130. The portable electronic device can be coupled to the RFID tag 130 by transmitting and receiving signals to and from the RFID tag 130.

According to a possible implementation, the RFID tag 130 can be encased in protective plastic, can be coated with protective material, and/or can be otherwise protected from weather, laundry, and other environmental elements. According to a possible implementation, the RFID tag 130 can operate in a 13.56 MHz band, which can have a read range of less than 1 meter.

According to a possible embodiment, the RFID tag 130 can be located within the pocket assembly 120 between the inner panel 122 and the outer panel 124. For example, the RFID tag 130 can be located on top of the electrically conductive material 124 in the sense the RFID tag 130 can be coupled to the electrically conductive material 124 on a side of the inner panel 122 that faces the outer panel 126. Alternately, the RFID tag 130 can be located on the outer panel 126, in a side panel (not shown), on a bottom panel 128, and/or anywhere else inside or outside the pocket assembly 120, on or in the article of clothing 100, and/or on or in the clothing body 110.

According to a possible embodiment, the RFID tag 130 can include at least one file, such as in memory 134, including the radio-frequency shielding information that includes a list of frequencies and effective radio-frequency shielding of the electrically conductive material 124 at the frequencies included in the list. The file can also include other shielding information and other information. For example, the information can include data, such as numbers, indicating shielding effectiveness. The data can indicate shielding effectiveness for different frequencies.

According to a possible embodiment, the RFID tag 130 can include at least one file with radio-frequency shielding information including information corresponding to at least one portable electronic device, such as the portable electronic device 140. There can be one or multiple files for devices from different manufacturers, for different models of devices, or other devices. For example, data on the file(s) can include shielding effectiveness for different cell phones that can include data on different brands and different models. The information can be encrypted. For example, information on effectiveness for different brands/manufacturers and/or products/models of devices can be encrypted, such as in encrypted files. The encrypted information for a particular brand and/or product can be decoded by a device of the particular brand and/or product, which can have access to a relevant encryption key for decoding the information. The information can also include effects of aging and the date of manufacture of the clothing 100 and/or the electrically conductive material 124. For example, the shielding of the electrically conductive material 124 may degrade over time and the information about the effects of aging and the data of manufacture can be provided. A portable electronic device that obtains the information can adjust its transmissions accordingly. In some embodiments the shielding information can include a single number to indicate shielding effectiveness for one or more models of portable electronic devices. The single number can be used as shielding effectiveness for one or more frequencies used by the portable electronic device.

According to a possible embodiment, the portable electronic device 140 can read at least the file with information relevant to the model of the portable electronic device 140 and/or the portable electronic device 140 can pull all the information and scan for information about the model of the portable electronic device 140. The portable electronic device 140 can then use the information to understand how the shielding impacts the portable electronic device 140. For example, a given model of a device may benefit from 10 dB of shielding and a different model of the device may benefit from 20 dB of shielding, as indicated in the file. The information can be determined from empirical testing or modeling prior to inclusion in the file and/or can be updated by the portable electronic device 140. The portable electronic device 140 can use the shielding effectiveness to understand how much power it can radiate and still meet targets for SAR and IPD.

The memory 134 can be one time written with device- and manufacturer-specific files at the time the article of clothing 100, such as a garment, was manufactured. The memory 134 can also include a generic file or different generic files for multiple devices from different manufacturers. Electronic device models created after the memory 134 was written can use the generic file from the memory 134 or can use a file from a device model that can be considered to have similar characteristics to the model not present on the memory 134. For example, a newer version of a phone model can use the file from an older version of the phone model when the newer version is placed in a pocket including the RFID tag 130. According to another possible implementation, the portable electronic device 140 can update the files in the memory 134. For example, a cellular phone can connect to a network and download the file relevant to the cellular phone and/or download an update package and write it to the memory 134.

To elaborate according to a possible embodiment, the at least one file can include a first information file that includes information corresponding to a first portable electronic device manufacturer and a second information file that includes information corresponding to a second portable electronic device manufacturer. For example, the information can include information about the shielding material for at least one portable electronic device of a particular manufacturer. The first information file can be encrypted with a first key corresponding to the first portable electronic device manufacturer and the second information file is encrypted with a second key corresponding to the portable electronic second device manufacturer.

According to a possible embodiment, the RFID tag 130 can include an antenna 132, a memory 134, and a controller 136 coupled to the antenna 132 and coupled to the memory 134. The memory 134 can store at least an identifier of the RFID tag 130 and/or can store files with information. The controller 136 can be powered via radio-frequency signals received via the antenna 132, such as from the portable electronic device 140. The controller 136 can communicate information including at least the identifier of the RFID tag 130 and/or the files via the antenna 132.

For example, the controller 136 can receive signals in a radio-frequency band from the portable electronic device 140 via the antenna 132. The controller 136 can operate using power from the received signals and can send data, such as the information, via the antenna 132. The controller 136 can use simple circuitry, such as a radio frequency circuit, to provide the data, or can be a processor or more complex circuitry that provides the data. Similarly, the memory 134 can be a simple element that provides a unique identifier that identifies the RFID tag 130 or can be more complex circuitry that stores at least one file that include the unique identifier and/or other information regarding the RFID tag 130. The controller 136 and the memory 134 can be part of a single integrated circuit chip and/or can be discrete elements on the RFID tag 130.

The portable electronic device 140 can be an apparatus that can include a plurality of antennas 142. The plurality of antennas 142 can include two or more antennas. The portable electronic device 140 can also include a first transceiver 144 coupled to the plurality of antennas 142. The first transceiver 144 can be a Wireless Wide Area Network (WWAN) transceiver, a millimeter wave (mmW) band transceiver, a transceiver that transmits above and/or below 6 GHz, a Wireless Local Area Network (WLAN) transceiver, and or any other transceiver or combination of transceivers. The portable electronic device 140 can also include a second transceiver 146. The second transceiver 146 can be an RFID transceiver in the sense that the second transceiver 146 can be any transceiver that can communicate with an RFID tag, such as the RFID tag 130.

The portable electronic device 140 can also include a controller 148 coupled to the first transceiver 144 and coupled to the RFID transceiver 146. The controller 148 can detect the presence of the RFID tag 130. The controller 148 can retrieve, in response to detecting the presence of the RFID tag 130, information corresponding to the RFID tag 130. The information can include radio-frequency shielding information regarding the electrically conductive material 124 of the article of clothing 100. The controller 148 can adjust the first transceiver 144 based on the information retrieved corresponding to the RFID tag 130.

According to a possible embodiment, the controller 148 can periodically check for presence of an RFID tag. The controller 148 can also detect that the portable electronic device 140 is in a pocket, such as by using a light sensor, a camera, touch sensors, or other methods. Upon determining the portable electronic device 140 is in a pocket, the controller 148 can activate a RFID reader, such as the second transceiver, and attempt to read the nearby RFID tag 130.

The controller 148 can retrieve information corresponding to the RFID tag 130 from a communication signal received via the RFID transceiver 146. Additionally, or alternately, the controller 148 can retrieve information corresponding to the RFID tag 130 from a communication signal received via the first transceiver 144. For example, the controller 148 can retrieve information corresponding to the RFID tag 130 by accessing a remote database via the first transceiver 144 using an identifier of the RFID tag 130. As a further example, the controller 148 can access the remote database via the first transceiver 144 in the form of a WWAN transceiver, in the form of a WLAN transceiver, in the form of any other transceiver, can access the remote database via a hardwired network connection, and/or can access the remote database via any other way of accessing a remote database. In some embodiments the controller 148 can have a local copy of the database.

For example, the controller 148 can retrieve information corresponding to the RFID tag 130 from a communication signal received via the first transceiver 144 by accessing a remote database via the first transceiver 144 and by retrieving the information corresponding to the RFID tag 130 from the remote database. The information corresponding to the RFID tag 130 can include effective radio-frequency shielding of an article of clothing corresponding to the RFID tag 130. For example, the controller 148 can obtain shielding information regarding the electrically conductive material 124 of the article of clothing 100.

As another example, the controller 148 can retrieve information corresponding to the RFID tag 130 from a communication signal received via the first transceiver 144 by receiving identifying information via the RFID transceiver 146. The controller 148 can then send a request, via the first transceiver 144, for the radio-frequency shielding information regarding the electrically conductive material 124 of the article of clothing 100. The request can include the identifying information. The controller 148 can then receive, via the first transceiver 144, the radio-frequency shielding information regarding electrically conductive material 124 of the article of clothing 110.

The controller 148 can adjust the first transceiver 144 by increasing an amount of output power transmitted by the first transceiver 144 based on information retrieved from the RFID tag 130, such as based on shielding effectiveness of the electrically conductive material 124. For example, the controller 148 can increase peak, maximum, and/or average output power of the first transceiver 144. It should be noted that the information received from the RFID tag 130 can include shielding information regarding the electrically conductive material 124, can include an RFID tag identifier where additional shielding information regarding the electrically conductive material can be retrieved from a network, and/or can include other information. In all instances the information used to adjust the transceiver 144 can be based on information regarding the electrically conductive material 124 and other shielding information while still being based on information retrieved from the RFID tag 130.

The controller 148 can also adjust the first transceiver 144 by adjusting antenna weighting of the first transceiver 144 applied to the plurality of antennas 142 based on the information retrieved from the RFID tag 130. For example, the antenna weighting can direct beams from the antennas 142 away from a user 150 wearing the article of clothing 100. The controller 148 can additionally adjust the first transceiver 144 by increasing a duty cycle of the first transceiver 144 based on the information retrieved from the RFID tag 130.

The RFID tag 130 can be detected by the controller 148 by the RFID transceiver 146 sending a periodic access request. The RFID tag 130 can also be detected by the controller 148 detecting the portable electronic device 140 is in a pocket and then the RFID transceiver 146 can responsively send a signal to detect RFID tag 130. For example, the controller 148 can detect the portable electronic device 140 is in a pocket using a camera, using a pressure sensor, using a proximity sensor, using a light sensor, or using any other method or device for detecting the portable electronic device 140 is in a pocket, such as the pocket assembly 120.

According to a possible embodiment, the controller 148 can output a user detectable indication informing the user 150 that the portable electronic device 140 is in a radio-frequency shielded pocket. The controller 148 can also output a user detectable indication to a user that the portable electronic device 140 is not in a radio-frequency shielded pocket. For example, the user detectable indication can be output as a visible signal, such as to a display or LED, as an audible signal, such as to a speaker, headset, or wireless headset, via a signal to a user wearable device that outputs a user detectable signal, or otherwise output so the user 150 can detect the information.

Figure 2:
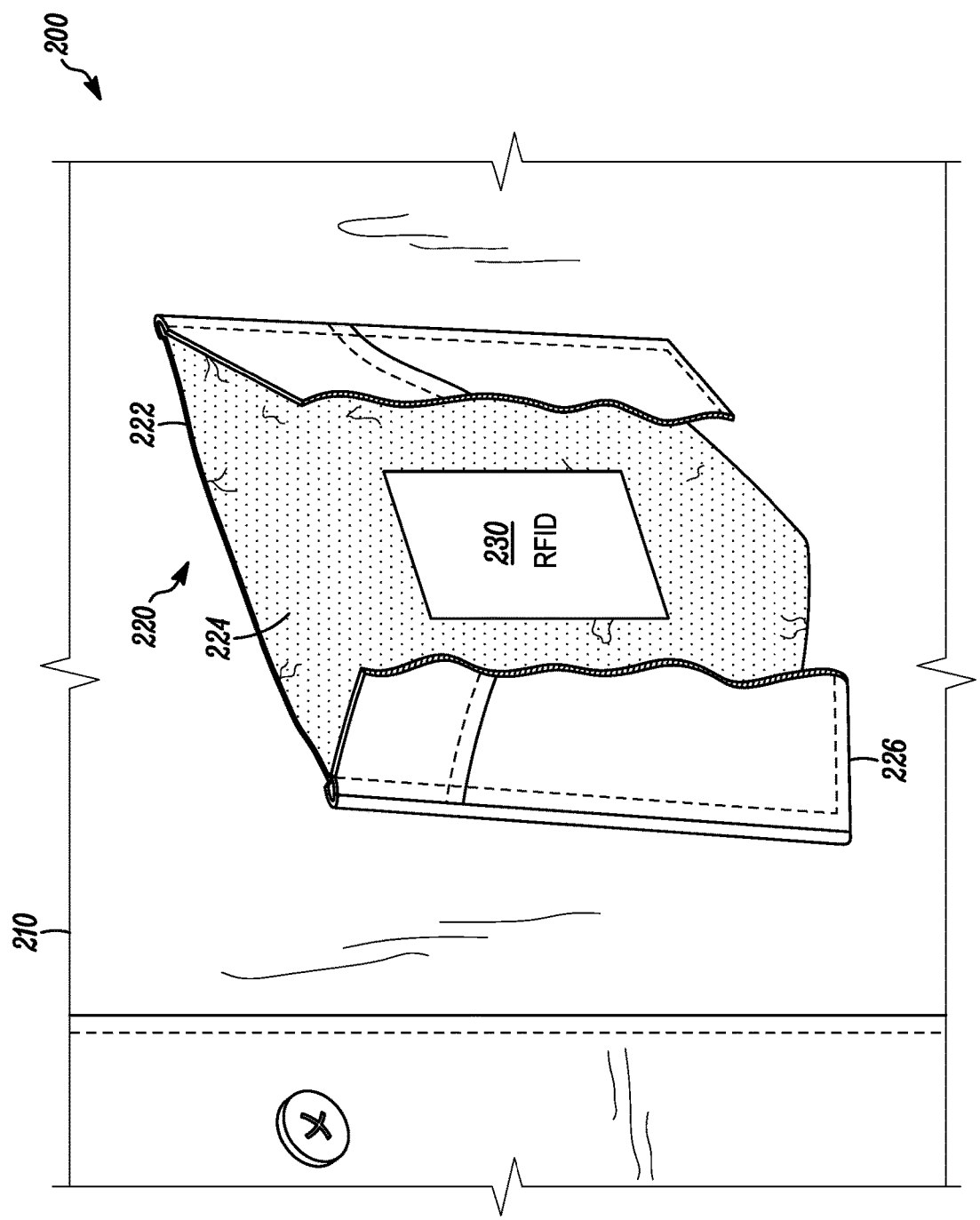
FIG. 2 is an example illustration of an article of clothing according to a possible embodiment.

FIG. 2 is an example illustration of an article of clothing 200, such as the article of clothing 100, according to a possible embodiment. In the present embodiment, the article of clothing 200 is illustrated as a portion of a shirt or jacket. The article of clothing 200 can include a clothing body 210. The article of clothing 200 can also include a pocket assembly 220 formed as part of the clothing body 210. The pocket assembly 220 can include an inner panel 222 disposed as a part of the pocket assembly 220. The inner panel 222 can include an electrically conductive material 224. The pocket assembly 220 can also include an outer panel 226 disposed as a part of the pocket assembly 220 that can be farther than the inner panel 222 from a user wearing the article of clothing 200. In the present illustration only a portion of the outer panel 226 is shown as a panel on an outer side of the pocket assembly 220. The article of clothing 200 can additionally include a RFID tag 230 coupled to the clothing body 210.

Figure 3:
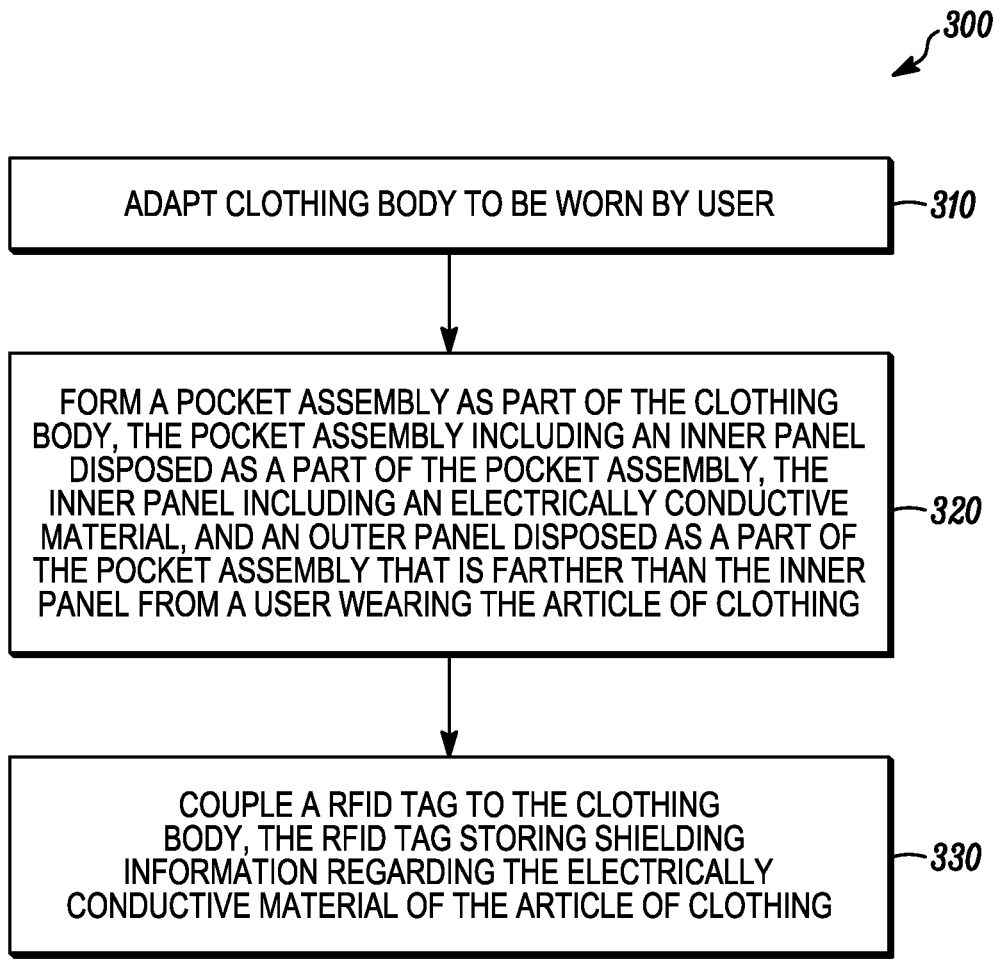
FIG. 3 is an example flowchart illustrating operation of providing an article of clothing according to a possible embodiment.

FIG. 3 is an example flowchart 300 illustrating operation of providing an article of clothing, such as the article of clothing 100, according to a possible embodiment. At 310, a clothing body can be adapted to be worn by a user. The clothing body can be adapted to be worn by a user by cutting articles of fabric, plastic, or other materials, by sewing articles of fabric and/or other materials together, by molding plastic, rubber, or other materials, by adding straps, fasteners, and/or other connectors to materials, and/or by otherwise combining materials in a manner that can be worn by a user.

At 320, a pocket assembly can be formed as part of the clothing body. The pocket assembly can include an inner panel disposed as a part of the pocket assembly. The inner panel can include an electrically conductive material. The pocket assembly can include an outer panel disposed as a part of the pocket assembly that is farther than the inner panel from a user when the user wears the article of clothing. According to a possible embodiment, the pocket assembly can be configured to hold a portable electronic device that emits radio-frequency energy. The electrically conductive material can include shield material that shields a user from the radio-frequency energy emitted from the portable electronic device.

At 330, an RFID tag can be coupled to the clothing body. Radio-frequency shielding information can be stored on the RFID tag. The radio-frequency shielding information can be information regarding the electrically conductive material of the article of clothing. For example, the radio-frequency shielding information can include information about characteristics of shielding of the electrically conductive material or the radio-frequency shielding information can be an identifier regarding the RFID tag and/or an identifier regarding the radio-frequency shielding information and a device that reads the RFID tag can obtain additional information based on the identifier. In some embodiments the RFID tag can store information to enable retrieving information on shielding of the article of clothing such as an URL that can be used to retrieve information on shielding.

According to a possible embodiment, the RFID tag can be located in the pocket assembly so that an electronic device stored in the pocket is coupled to and communicates with the RFID tag. According to a possible embodiment, the RFID tag can be located within the pocket assembly between the inner panel and the outer panel.

According to a possible embodiment, a file with the radio-frequency shielding information can be included in the RFID tag. The radio-frequency shielding information can include a list of frequencies and effective radio-frequency shielding of the electrically conductive material at the frequencies included in the list. According to a possible embodiment, at least one file with radio-frequency shielding information can be included in the RFID tag. The radio-frequency shielding information can include information corresponding to at least one electronic device. The at least one file can include a first information file that includes information corresponding to a first device manufacturer and a second information file that includes information corresponding to a second device manufacturer. The first information file can be encrypted with a first key corresponding to the first device manufacturer. The second information file can be encrypted with a second key corresponding to the second device manufacturer.

Figure 4:
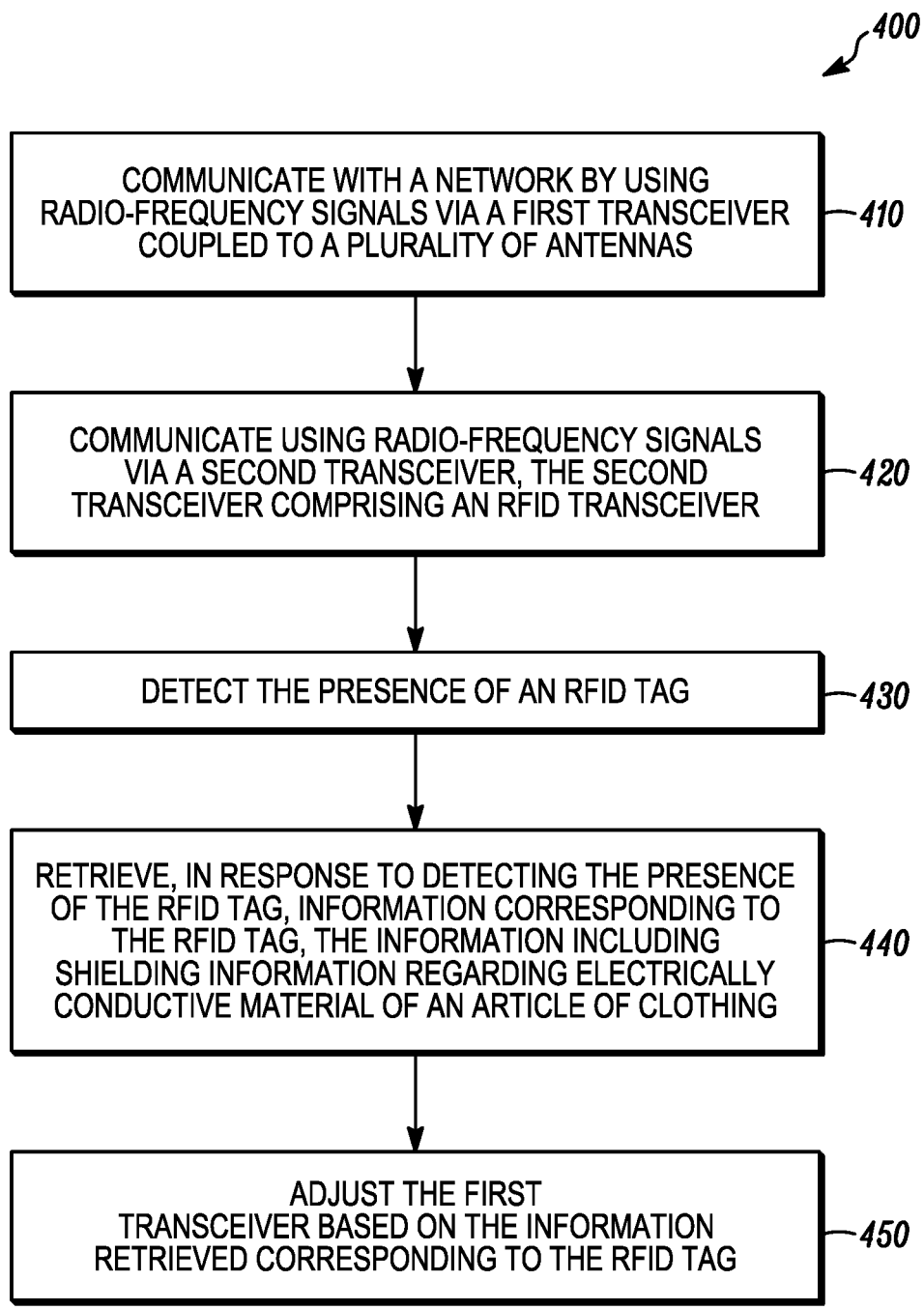
FIG. 4 is an example flowchart illustrating operation of an apparatus according to a possible embodiment.

FIG. 4 is an example flowchart 400 illustrating operation of an apparatus, such as the portable electronic device 140, according to a possible embodiment. At 410, a network can be communicated with using radio-frequency signals via a first transceiver coupled to a plurality of antennas. At 420, radio-frequency signals can be used to communicate via a second transceiver. The second transceiver can be an RFID transceiver. At 430, the presence of an RFID tag can be detected.

At 440, information corresponding to the RFID tag can be retrieved in response to detecting the presence of the RFID tag. The information can include radio-frequency shielding information regarding electrically conductive material of an article of clothing. Retrieving information can include retrieving information corresponding to the RFID tag from a communication signal received via the RFID transceiver. Retrieving information can also include retrieving information corresponding to the RFID tag from a communication signal received via the first transceiver. Information corresponding to the RFID tag can be retrieved from a communication signal received via the first transceiver by accessing a remote database via the first transceiver and retrieving the information corresponding to the RFID tag from the remote database. The information corresponding to the RFID tag can include effective radio-frequency shielding of an article of clothing corresponding to the RFID tag. Information corresponding to the RFID tag can also be retrieved from a communication signal received via the first transceiver by receiving identifying information via the RFID transceiver, by sending a request, via the first transceiver, for the radio-frequency shielding information regarding electrically conductive material of the article of clothing, the request including the identifying information, and by receiving, via the first transceiver, the radio-frequency shielding information regarding electrically conductive material of the article of clothing.

At 450, the first transceiver can be adjusted based on the information retrieved corresponding to the RFID tag. The first transceiver can be adjusted by increasing an amount of output power transmitted by the first transceiver based on information retrieved from the RFID tag. The first transceiver can also be adjusted by adjusting antenna weighting of the first transceiver applied to the plurality of antennas based on the information retrieved from the RFID tag. The first transceiver can additionally be adjusted by increasing a duty cycle of the first transceiver based on the information retrieved from the RFID tag.

According to a possible embodiment, a user detectable indication can be output. The user detectable indication can inform a user that the apparatus is in a radio-frequency shielded pocket. The user detectable indication can also inform a user that the apparatus is not in a radio-frequency shielded pocket.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

At least some embodiments can provide for a portable electronic device to reduce transmit power, such as duty cycle, max power, and/or average power, to reduce IPD and/or SAR. At least some embodiments can provide for a portable electronic device with multiple antennas or a weighted antenna array and for the portable electronic device to choose an antenna or antenna weights based on the portable electronic device being in a pocket with shielding. At least some embodiments can also provide for a portable electronic device to determine it is in a pocket by using the camera, by using a light sensor, by detecting that an antenna is dielectrically loaded, and/or by other ways of detecting a portable electronic device is in a pocket.

According to at least some embodiments, shielding material can be added to a pocket to provide additional protection to the user by reducing the emitted radiation that is incident or absorbed by the user. An RFID tag, such as an NFC tag, can be added to a pocket. A portable electronic device can read the RFID tag, determine that the clothing provides protection to the user, and the portable electronic device can increase the amount of power transmitted accordingly. The RFID tag can be located in the pocket so that a portable electronic device stored in the pocket can be coupled to and can communicate with the RFID tag.

According to at least some embodiments, the duty cycle of the transmitter may be increased based on the presence of the RFID tag. The peak, maximum, or average transmit power can also be increased based on the presence of the RFID tag. The portable electronic device can additionally choose different antennas or antenna weights based on the presence of the RFID tag.

According to at least some embodiments, the RFID tag can include information that the portable electronic device can use to determine how much shielding the clothing has in the pocket. The amount of shielding can be dependent on frequency.

According to at least some embodiments, the RFID tag may include a bar code or equivalent universal code and a portable electronic device can identify the garment using the code, such as by taking a picture or scanning the code while in a pocket. The portable electronic device can then access a database to determine the effective shielding of the clothing. The database can be managed by a network operator, a garment manufacturer, a consumer device manufacturer, and/or another party.

According to at least some embodiments, the RFID tag can include a first file with shielding information such as a list of frequencies and effective shielding at those frequencies. The RFID tag can also include a second file that includes shielding information for a specific device. There can be multiple files for devices from different manufacturers. The files can be encrypted to allow devices to confirm that the file was generated from an authorized source.

According to at least some embodiments, a RFID tag can be read from far away and an antenna the RFID tag can be tuned, such as hampered, so that the portable electronic device has to be close to RFID tag to read it. The info in the RFID tag can be a Universal Product Code (UPC) and the portable electronic device can look up the clothing to find information indicating how much shielding and indicating whether the shielding is either flat or at different frequencies, such as based on a single number, a table, and/or other information. Files on the RFID can be encrypted files specific to different manufacturers. The portable electronic device can also provide feedback to user about presence of shielding.

Based on testing, at least a 30 dB improvement can be obtained for portable electronic device transmissions according to at least some embodiments. Further testing at 30 GHz, which is mmWave, has shown that air measured 51.5 W/m^2 and jeans with no shield measured 46.6 W/m^2 for IPD where a mandated limit can be 10 W/m^2. Thus, 5G devices may have trouble meeting IPD when operating at mmWave frequencies without attenuating power output. However, jeans with electrically conductive material as a shield measured 0.036 W/m^2, which is 1,000 times better than without the electrically conductive material. This can allow 5G devices to increase transmission power and have better performance. Similarly, testing at 800 MHz has shown that jeans with electrically conductive material as a shield measured 8.18E−07 w/kg, which is also at least 1,000 times better than without the electrically conductive material. This can allow 5G devices to increase transmission power and have better performance.

Figure 5:
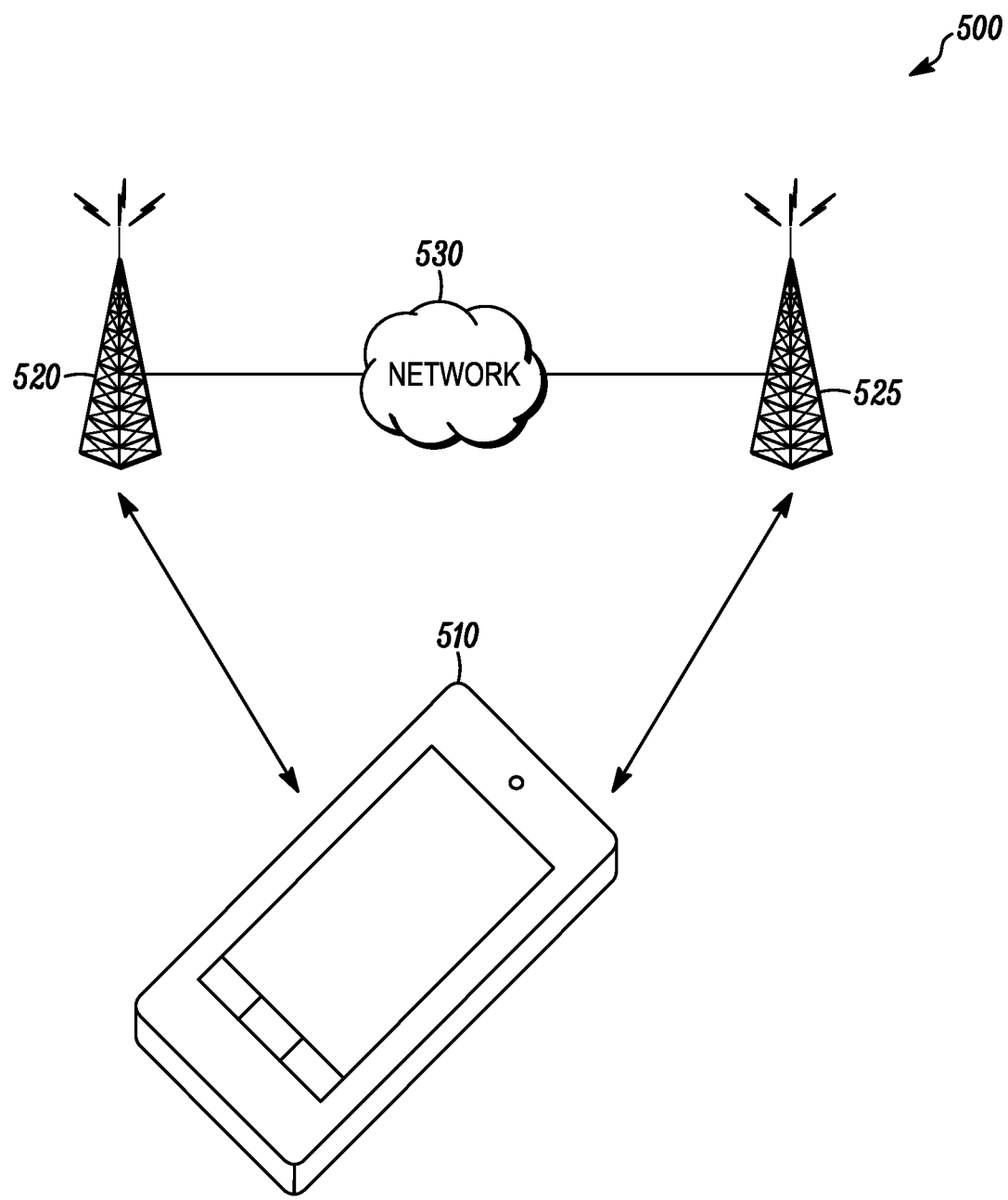
FIG. 5 is an example block diagram of a system according to a possible embodiment.

FIG. 5 is an example block diagram of a system 500 according to a possible embodiment. The system 500 can include a UE 510, such as the portable electronic device 140, at least one network entity 520 and 525, and a network 530. The UE 510 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The at least one network entity 520 and 525 can be a wireless wide area network base station, can be a NodeB, can be an enhanced NodeB (eNB), can be a New Radio NodeB (gNB), such as a 5G NodeB, can be an unlicensed network base station, can be an access point, can be a base station controller, can be a network controller, can be a Transmission/Reception Point (TRP), can be a different type of network entity from each other, and/or can be any other network entity that can provide wireless access between a UE and a network.

The network 530 can include any type of network that is capable of sending and receiving wireless communication signals. For example, the network 530 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3GPP-based network, a satellite communications network, a high altitude platform network, the Internet, and/or other communications networks.

In operation, the UE 510 can communicate with the network 530 via at least one network entity 520 by using radio-frequency communication signals. For example, the UE 510 can send and receive control signals on a control channel and user data signals on a data channel.

Figure 6:
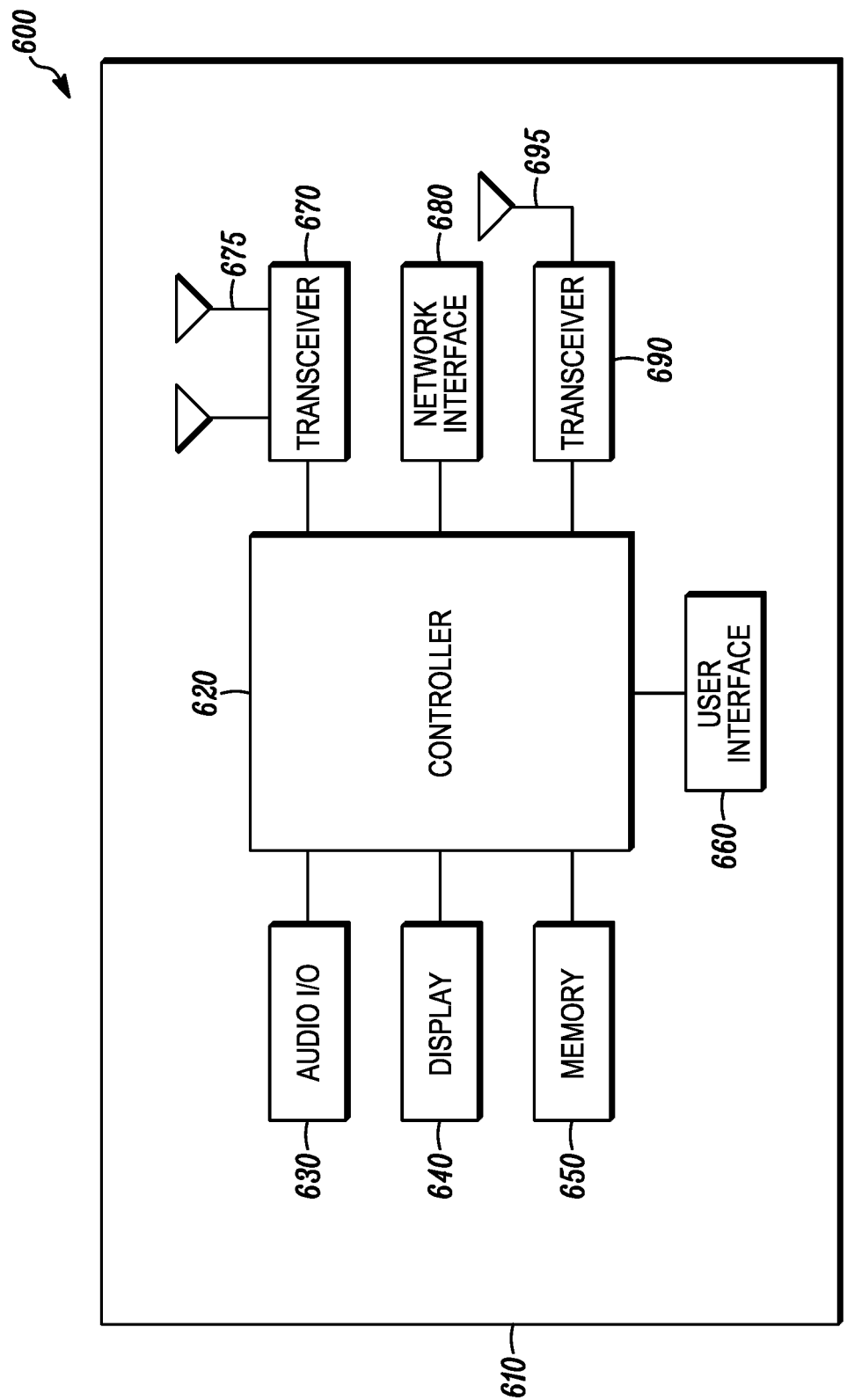
FIG. 6 is an example block diagram of an apparatus according to a possible embodiment.

FIG. 6 is an example block diagram of an apparatus 600, such as the portable electronic device 140, or any other wireless communication device disclosed herein, according to a possible embodiment. The apparatus 600 can include a housing 610, a controller 620 coupled to the housing 610, audio input and output circuitry 630 coupled to the controller 620, a display 640 coupled to the controller 620, a memory 650 coupled to the controller 620, a user interface 660 coupled to the controller 620, a transceiver 670 coupled to the controller 620, at least one antenna 675 coupled to the transceiver 670, a network interface 680 coupled to the controller 620, a short-range communication transceiver 690 coupled to the controller 620, and at least one antenna 695 coupled to the short-range communication transceiver 690. The apparatus 600 may not necessarily include all of the illustrated elements for different embodiments of the present disclosure. The apparatus 600 can perform the methods described in all the embodiments.

The display 640 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 670 can be any transceiver that can communicate using radio-frequency signals and can include one or more transceivers that can include a transmitter and/or a receiver. The short-range communication transceiver 690 can be a RFID transceiver, a NFC transceiver, or any other transceiver that can communicate with a RFID tag. The audio input and output circuitry 630 can include a microphone, a speaker, a transducer, or any other audio input and output circuitry. The user interface 660 can include a keypad, a keyboard, buttons, a touch pad, a joystick, a touch screen display, another additional display, or any other device useful for providing an interface between a user and an electronic device. The network interface 680 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 650 can include a Random-Access Memory (RAM), a Read Only Memory (RON), an optical memory, a solid-state memory, a flash memory, a removable memory, a hard drive, a cache, or any other memory that can be coupled to an apparatus.

The apparatus 600 or the controller 620 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 650, elsewhere on the apparatus 600, in cloud storage, and/or anywhere else that can store software and/or an operating system. The apparatus 600 or the controller 620 may also use hardware to implement disclosed operations. For example, the controller 620 may be any programmable processor. Furthermore, the controller

620 may perform some or all of the disclosed operations. For example, some operations can be performed using cloud computing and the controller 620 may perform other operations. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 620 may be any controller or processor device or devices capable of operating an apparatus and implementing the disclosed embodiments. Some or all of the additional elements of the apparatus 600 can also perform some or all of the operations of the disclosed embodiments.

In operation, the apparatus 600 can perform the methods and operations of the disclosed embodiments. The transceiver 670 can transmit and receive signals, including control signals and data signals and including information, such as control and data information. The short-range communication transceiver 690 can communicate with an RFID tag. The controller 620 can generate and process the transmitted and received signals and information according to the disclosed embodiments.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of,'" "at least one selected from the group of" or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. An apparatus comprising:
    a plurality of antennas;
    a first transceiver coupled to the plurality of antennas;
    a second transceiver, the second transceiver comprising a radio-frequency identification transceiver; and
    a controller coupled to the first transceiver and coupled to the radio-frequency identification transceiver, where the controller
        detects the presence of a radio-frequency identification tag;
        retrieves, in response to detecting the presence of the radio-frequency identification tag, information corresponding to the radio-frequency identification tag, the information corresponding to the radio-frequency identification tag including radio-frequency shielding information regarding electrically conductive material of an article of clothing; and
        adjusts the first transceiver based on the information retrieved corresponding to the radio-frequency identification tag.

2. The apparatus according to claim 1, wherein the controller retrieves information corresponding to the radio-frequency identification tag from a communication signal received via the radio-frequency identification transceiver.

3. The apparatus according to claim 1, wherein the controller retrieves information corresponding to the radio-frequency identification tag from a communication signal received via the first transceiver.

4. The apparatus according to claim 3,
    wherein the controller retrieves information corresponding to the radio-frequency identification tag from a communication signal received via the first transceiver by
        accessing a remote database via the first transceiver, and
        retrieving the information corresponding to the radio-frequency identification tag from the remote database, and
    wherein the information corresponding to the radio-frequency identification tag includes effective radio-frequency shielding of the article of clothing, which corresponds to the radio-frequency identification tag.

5. The apparatus according to claim 3, wherein the controller retrieves information corresponding to the radio-frequency identification tag from a communication signal received via the first transceiver by:
    receiving identifying information via the radio-frequency identification transceiver;
    sending a request, via the first transceiver, for the radio-frequency shielding information regarding electrically conductive material of the article of clothing, the request including the identifying information; and
    receiving, via the first transceiver, the radio-frequency shielding information regarding electrically conductive material of the article of clothing.

6. The apparatus according to claim 1, wherein the controller adjusts the first transceiver by increasing an amount of output power transmitted by the first transceiver based on information retrieved from the radio-frequency identification tag.

7. The apparatus according to claim 1, wherein the controller adjusts the first transceiver by adjusting antenna weighting of the first transceiver applied to the plurality of antennas based on the information retrieved from the radio-frequency identification tag.

8. The apparatus according to claim 1, wherein the controller adjusts the first transceiver by increasing a duty cycle of the first transceiver based on the information retrieved from the radio-frequency identification tag.

9. The apparatus according to claim 1, wherein the controller outputs a user detectable indication informing a user that the apparatus is in a radio-frequency shielded pocket.

10. The apparatus according to claim 1, wherein the controller outputs a user detectable indication informing a user that the apparatus is not in a radio-frequency shielded pocket.

11. A method in an apparatus, the method comprising:
communicating with a network by using radio-frequency signals via a first transceiver coupled to a plurality of antennas;
communicating using radio-frequency signals via a second transceiver, the second transceiver comprising a radio-frequency identification transceiver;
detecting the presence of a radio-frequency identification tag;
retrieving, in response to detecting the presence of the radio-frequency identification tag, information corresponding to the radio-frequency identification tag, the information corresponding to the radio-frequency identification tag including radio-frequency shielding information regarding electrically conductive material of an article of clothing; and
adjusting the first transceiver based on the information retrieved corresponding to the radio-frequency identification tag.

12. The method according to claim 11, wherein retrieving information comprises retrieving information corresponding to the radio-frequency identification tag from a communication signal received via the radio-frequency identification transceiver.

13. The method according to claim 11, wherein retrieving information comprises retrieving information corresponding to the radio-frequency identification tag from a communication signal received via the first transceiver.

14. The method according to claim 13,
wherein retrieving information comprises retrieving information corresponding to the radio-frequency identification tag from a communication signal received via the first transceiver by
accessing a remote database via the first transceiver, and
retrieving the information corresponding to the radio-frequency identification tag from the remote database, and
wherein the information corresponding to the radio-frequency identification tag includes effective radio-frequency shielding of an article of clothing corresponding to the radio-frequency identification tag.

15. The method according to claim 13, wherein retrieving information comprises retrieving information corresponding to the radio-frequency identification tag from a communication signal received via the first transceiver by:
receiving identifying information via the radio-frequency identification transceiver,
sending a request, via the first transceiver, for the radio-frequency shielding information regarding electrically conductive material of the article of clothing, the request including the identifying information, and
receiving, via the first transceiver, the radio-frequency shielding information regarding electrically conductive material of the article of clothing.

16. The method according to claim 11, wherein adjusting the first transceiver comprises adjusting the first transceiver by increasing an amount of output power transmitted by the first transceiver based on information retrieved from the radio-frequency identification tag.

17. The method according to claim 11, wherein adjusting the first transceiver comprises adjusting the first transceiver by adjusting antenna weighting of the first transceiver applied to the plurality of antennas based on the information retrieved from the radio-frequency identification tag.

18. The method according to claim 11, wherein adjusting the first transceiver comprises adjusting the first transceiver by increasing a duty cycle of the first transceiver based on the information retrieved from the radio-frequency identification tag.

19. The method according to claim 11, further comprising outputting a user detectable indication informing a user that the apparatus is in a radio-frequency shielded pocket.

20. The method according to claim 11, further comprising outputting a user detectable indication informing a user that the apparatus is not in a radio-frequency shielded pocket.

* * * * *